(12) United States Patent
Liu et al.

(10) Patent No.: US 11,303,620 B2
(45) Date of Patent: Apr. 12, 2022

(54) REALTIME URBAN TRAFFIC STATUS MONITORING METHOD BASED ON PRIVACY-PRESERVING COMPRESSIVE SENSING

(71) Applicant: Fuzhou University, Fuzhou (CN)

(72) Inventors: Ximeng Liu, Fuzhou (CN); Wenzhong Guo, Fuzhou (CN); Jiayin Li, Fuzhou (CN); Xiaoyan Li, Fuzhou (CN); Hongbin Zhuang, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 0 days.

(21) Appl. No.: 17/152,990

(22) Filed: Jan. 20, 2021

(65) Prior Publication Data
US 2022/0014506 A1    Jan. 13, 2022

(30) Foreign Application Priority Data
Jul. 8, 2020  (CN) .......................... 202010649250.3

(51) Int. Cl.
*H04L 29/06* (2006.01)
*G08G 1/01* (2006.01)

(52) U.S. Cl.
CPC ........ *H04L 63/0485* (2013.01); *G08G 1/0116* (2013.01)

(58) Field of Classification Search
CPC ........................ H04L 63/0485; G08G 1/0166
USPC .......................................................... 713/150
See application file for complete search history.

(56) References Cited

U.S. PATENT DOCUMENTS

| 10,545,247 | B2 * | 1/2020 | Zheng | .................. G08G 1/065 |
| 2013/0151088 | A1 * | 6/2013 | Ricci | .................. G08G 1/0133 |
| | | | | 701/51 |
| 2016/0189544 | A1 * | 6/2016 | Ricci | .................. G08G 1/0116 |
| | | | | 701/117 |

\* cited by examiner

*Primary Examiner* — Michael S McNally
(74) *Attorney, Agent, or Firm* — Ziegler IP Law Group, LLC

(57) ABSTRACT

The present disclosure relates to a realtime urban traffic status monitoring method based on privacy-preserving compressive sensing, including the following steps: step S1: dividing vehicle data under privacy preserving into two parts, and sending the two parts to two different road side units (RSU) for preprocessing; step S2: outsourcing, by the two different RSUs, preprocessed vehicle data to two cloud platforms (CP) respectively, and designing a data encryption execution protocol based on a finally expected operation result and interactive operation between the two CPs, to encrypt the data; and step S3: receiving, by a navigation service provider (NSP), encrypted data from the CPs, decrypting the received encrypted data, and estimating an urban traffic status by using a compressive sensing technology. The present disclosure can remarkably enhance a capability of protecting privacy of vehicle data, ensure rapid and accurate data processing, reduce energy consumed for urban traffic estimation, and shorten required traffic estimation time.

8 Claims, 3 Drawing Sheets

REALTIME URBAN TRAFFIC STATUS MONITORING METHOD BASED ON PRIVACY-PRESERVING COMPRESSIVE SENSING

TECHNICAL FIELD

The present disclosure relates to the field of urban traffic estimation, and specifically, to a realtime urban traffic status monitoring method based on privacy-preserving compressive sensing.

BACKGROUND

In recent years, with the acceleration of urbanization in China, more vehicles are driving on urban roads, and this intensifies traffic congestion. Long-time traffic congestion not only causes serious waste of time and energy, affecting efficiency of urban economy to a certain extent, but also increases a probability of traffic accidents. Compared with extension of urban roads, vehicles are obviously growing faster. This means that urban traffic congestion will become increasingly serious. In recent years, people have been widely aware of the importance of realtime urban traffic monitoring. Traffic congestion can be effectively alleviated if drivers obtain a road congestion status in real time. Conventional traffic congestion estimation methods are all based on static traffic sensors such as a closed circuit camera and an inductive loop detector. These conventional methods are not suitable for large-scale use because of high deployment and maintenance costs. As vehicle-mounted sensors have increasingly good performance, vehicle data collection has become an important means for obtaining a traffic congestion status, and for example, is used for Google and Baidu maps. However, due to a large quantity of roads, it is necessary to collect and analyze mass vehicle data to obtain the traffic congestion status. This imposes new requirements for data storage and data processing. Therefore, it is urgent to own a device that can provide sufficient data storage and have a powerful data processing capability.

To implement traffic monitoring through vehicle data analysis, the vehicle data needs to be outsourced to a cloud. However, the vehicle data includes some sensitive information such as global positioning system (GPS) positions, report time, and speeds. Therefore, it needs to be ensured that the outsourced data is not leaked without authorization. If an attacker continuously intercepts data such as a speed and a GPS position, a driving route of a driver can be predicted by using a mining technology. What's more, GPS position information also reveals places the driver often visits, such as homes, offices and restaurants. In addition, a destination of the driver may also be predicted by comparing a start position and data collected from an odometer. Therefore, it is extremely important to protect privacy of the data. Data encryption algorithms include a homomorphic encryption (HE) algorithm and secure multiparty computation (MPC). However, even if the outsourced data stored in the cloud is encrypted, it is still difficult to speed up operation efficiency of the data encryption algorithm without damaging privacy of original data. In addition, with a rapid increase in urban roads and vehicles, it is impossible to collect data of all roads because this will increase a time delay of traffic monitoring. Therefore, it is necessary to use a little data to estimate a traffic congestion status of an entire road network.

SUMMARY

In view of this, an objective of the present disclosure is to provide a realtime urban traffic status monitoring method based on privacy-preserving compressive sensing, to remarkably enhance a capability of protecting privacy of vehicle data, ensure rapid and accurate data processing, reduce energy consumed for urban traffic estimation, and shorten required traffic estimation time.

To achieve the above objective, the present disclosure uses the following technical solutions.

A realtime urban traffic status monitoring method based on privacy-preserving compressive sensing includes the following steps:

step S1: dividing vehicle data under privacy preserving into two parts, and sending the two parts to two different road side units (RSU) for preprocessing;

step S2: outsourcing, by the two different RSUs, preprocessed vehicle data to two cloud platforms (CP) respectively, and designing a data encryption execution protocol based on a finally expected operation result and interactive operation between the two CPs, to encrypt the data; and step S3: receiving, by a navigation service provider (NSP), encrypted data from the CPs, decrypting the received encrypted data, and estimating an urban traffic status by using a compressive sensing technology.

Further, the step S1 specifically includes the following substeps:

step S11: completing a setting that there are n roads in a city, a total of m pieces of data are uploaded by all vehicles on a road section j within a time period T, and each piece of data is in a format of $u=[t,v,lat,lon]$, where t is uploading time, v is an instantaneous speed of a vehicle, and lat and lon are a longitude and a latitude of the vehicle;

step S12: constructing, by a system, the reported data as a vector $U_j=[u_{(j,1)}, u_{(j,2)}, \ldots, u_{(j,m)}]^T$ and a matrix $M=[U_1, U_2, \ldots, U_n]$:

$$M = \begin{bmatrix} u_{(1,1)} & u_{(2,1)} & \cdots & u_{(n,1)} \\ u_{(1,2)} & u_{(2,2)} & \cdots & u_{(n,2)} \\ \vdots & \vdots & \ddots & \vdots \\ u_{(1,m)} & u_{(2,m)} & \cdots & u_{(n,m)} \end{bmatrix}$$

randomly dividing the matrix M into M' and M":

$$M' = \begin{bmatrix} u'_{(1,1)} & u'_{(2,1)} & \cdots & u'_{(n,1)} \\ u'_{(1,2)} & u'_{(2,2)} & \cdots & u'_{(n,2)} \\ \vdots & \vdots & \ddots & \vdots \\ u'_{(1,m)} & u'_{(2,m)} & \cdots & u'_{(n,m)} \end{bmatrix}$$

$$M'' = \begin{bmatrix} u''_{(1,1)} & u''_{(2,1)} & \cdots & u''_{(n,1)} \\ u''_{(1,2)} & u''_{(2,2)} & \cdots & u''_{(n,2)} \\ \vdots & \vdots & \ddots & \vdots \\ u''_{(1,m)} & u''_{(2,m)} & \cdots & u''_{(n,m)} \end{bmatrix}$$

where $u_{(i,j)}$ represents the $i^{th}$ data set reported on the $j^{th}$ road section, and $u_{(i,j)}'$ and $u_{(i,j)}''$ represent two random components of $u_{(i,j)}$, namely, $u_{(i,j)}=u_{(i,j)}'+u_{(i,j)}''$:

step S13: sending the two random components to the different RSUs respectively;

step S14: processing, by the RSU when receiving data U, the data, constructing a vector $V=[v_1, v_2, v_3 \ldots, v_m]$ based on an instantaneous speed in each piece of data, and computing an average speed on the road section according to the following formula:

$$v_\perp = \frac{\sum_{i=1}^{m} v_i}{m}$$

step S15: completing a setting that a quantity of known road sections is w, and obtaining the average speed $V_\perp=[v_{(\perp,1)}, v_{(\perp,2)}, \ldots, v_{(\perp,w)}]$; and then dividing, by the RSU, the average speed into two vectors $V_\perp'=[v_{(\perp,1)}', v_{(\perp,2)}', \ldots, v_{(\perp,w)}']$ and $V_\perp''=[v_{(\perp,1)}'', v_{(\perp,2)}'', \ldots, v_{(\perp,w)}'']$, where same processing is performed on the longitude and the latitude; and step S16: outsourcing, to the CPs, vectors N' and N" obtained by dividing N, in other words, sending the vector N' to CP A (CPA) and the vector N" to CP B (CPB).

Further, the data encryption execution protocol is a data encryption protocol based on secure two-party computation, and includes a basic secure computation protocol and a matrix secure computation protocol.

Further, the basic secure computation protocol includes a secure multiplicative protocol, a secure division protocol, a secure cosine protocol, a secure sine protocol, an extended secure cosine protocol, a reverse exponential protocol, an extended multiplicative protocol, and a secure arccosine protocol.

Further, the matrix secure computation protocol specifically refers to extended secure computation protocols Mmul and Mdiv that are designed by means of hadamard product, where Mmul and Mdiv are respectively obtained by replacing random numbers in Mul and Div with matrices.

Further, the data encryption protocol based on secure two-party computation further integrates the compressive sensing theory. Specifically, a measurement matrix and a sparse representation matrix that are required for compressive sensing are also used as keys for vehicle data encryption, and then are integrated into the data encryption protocol based on secure two-party computation.

Further, the step S3 specifically includes the following substeps:

step S31: completing a setting that there are n road sections in a city, and computing traffic congestion rates of w road sections within a time interval T' (w<<n), where CPA has a vector $C'=[c_1', c_2', \ldots, c_w']$ and CPB has a vector $C''=[c_1'', c_2'', \ldots, c_w'']$;

step S32: generating, by a third-party service provider (TPS), a random measurement matrix $\Phi \in \mathbb{R}^{r \times n}$, and receiving, by the NSP, component vectors C', C", $\Phi$, $\Psi_1$, and $\Psi_2$, to obtain a formula $C'+C''=\Phi \times (\Psi_1+\Psi_2) \times C$, where C includes the traffic congestion rates of all the road sections; and step S33: obtaining, by the NSP, C based on an optimization algorithm, and sending a road traffic status to a vehicle by using a navigation application.

A realtime urban traffic status monitoring system based on privacy-preserving compressive sensing includes data vehicles (DVs), two RSUs, two CPs, a TPS, and an NSP.

The DVs are configured to obtain vehicle traveling data.

The RSU is configured to preprocess the vehicle traveling data, and outsource preprocessed vehicle data to the two CPs respectively.

The CP is configured to store and further process the data.

The TPS is trusted by all parties and responsible for generating a required random number.

The NSP is configured to receive ciphertext from the CP, estimate a traffic status of a road section, and transmit an estimated traffic congestion rate to a vehicle.

Compared with the prior art, the present disclosure has the following beneficial effects:

The present disclosure can remarkably enhance a capability of protecting privacy of vehicle data, ensure rapid and accurate data processing, reduce energy consumed for urban traffic estimation, and shorten required traffic estimation time.

DETAILED DESCRIPTION

The present disclosure is described in more detail with reference to the accompanying drawings and embodiments.

Figure 1:
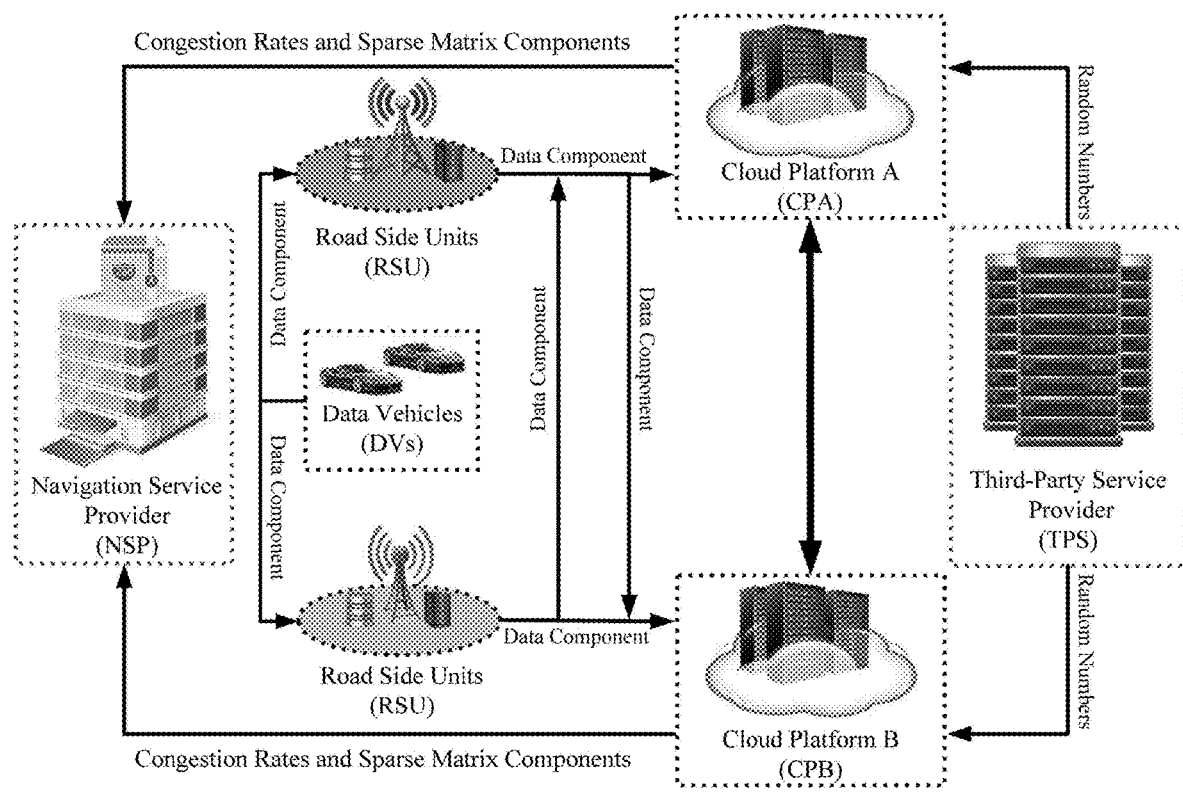
FIG. 1 shows a privacy-preserving compressive sensing system in an embodiment of the present disclosure.
Figure 2:
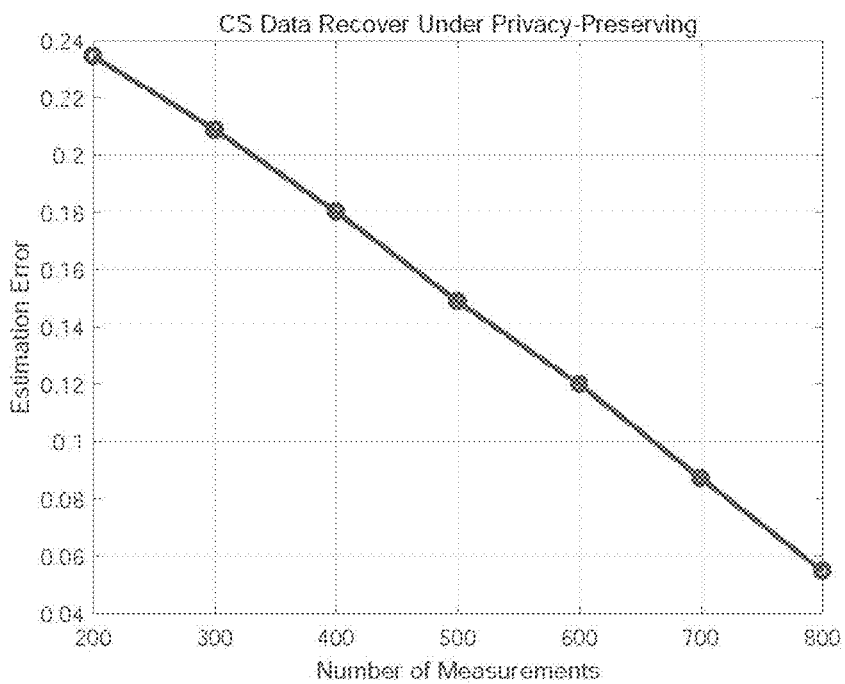
FIG. 2 shows compressive sensing data recovery under privacy preserving in an embodiment of the present disclosure.
Figure 3:
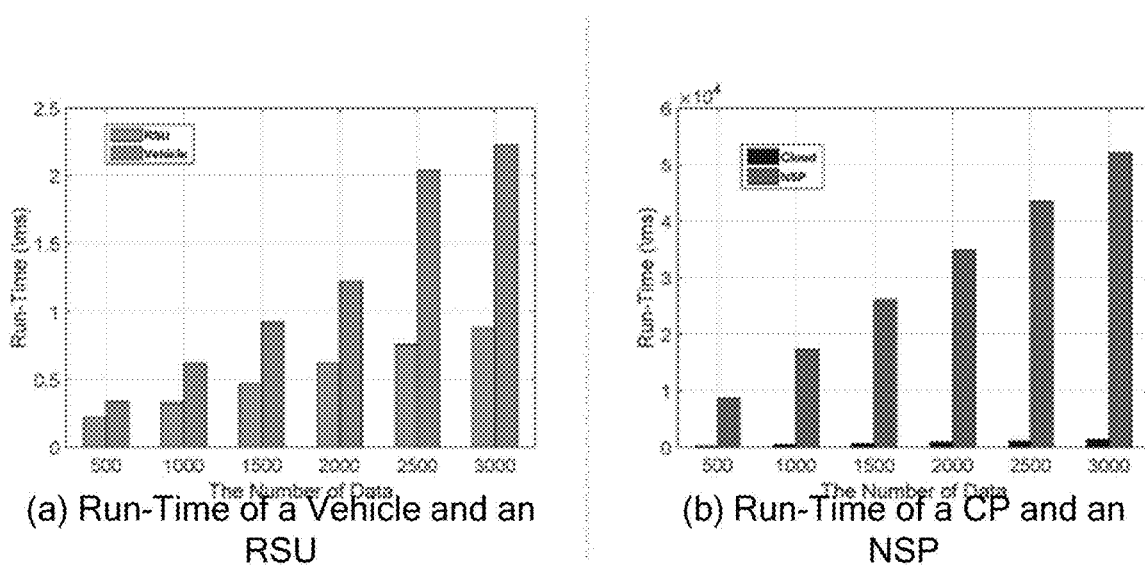
FIG. 3 shows computation overheads in an embodiment of the present disclosure, where a indicates run-time of a vehicle and an RSU, and b indicates run-time of a CP and an NSP.
Figure 4:
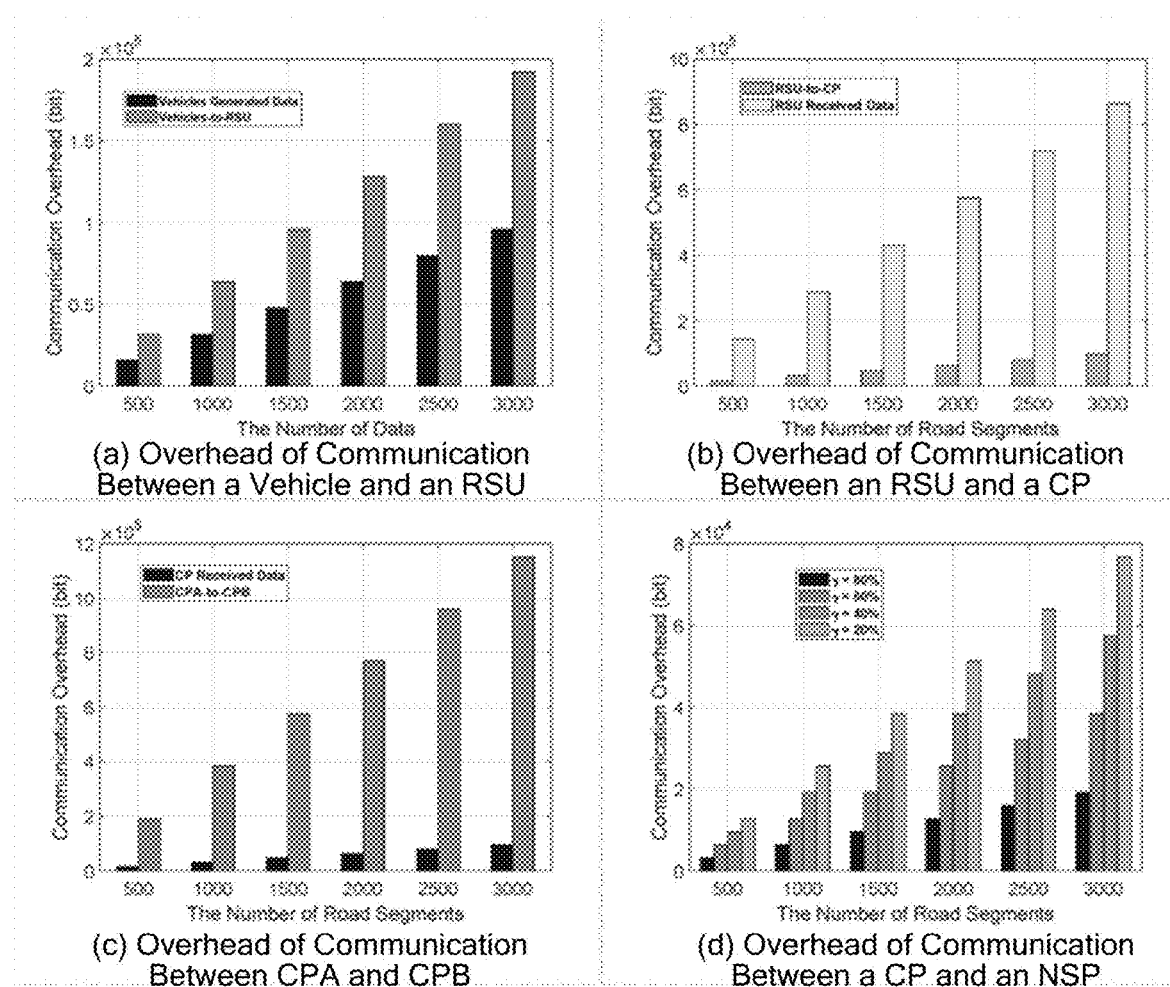
FIG. 4 shows communication overheads in an embodiment of the present disclosure, where a indicates an overhead of communication between a vehicle and an RSU, b indicates an overhead of communication between an RSU and a CP, c indicates an overhead of communication between CPA and CPB, and d indicates an overhead of communication between a CP and an NSP.

Refer to FIG. 1. The present disclosure provides a real-time urban traffic status monitoring system based on privacy-preserving compressive sensing, including DVs, two RSUs, two CPs (CPA/CPB), a TPS, and an NSP.

In this embodiment, a realtime urban traffic status monitoring method based on privacy-preserving compressive sensing includes the following steps:

Step S1: Divide vehicle data under privacy preserving into two parts, and send the two parts to the two different RSUs for preprocessing.

1) The vehicle data needs to be securely uploaded to the RSUs. It is set that there are n roads in a city, a total of m pieces of data are uploaded by all vehicles on a road section j within a time period T, and each piece of data is in a format of u=[t,v,lat,lon], where t is uploading time, v is an instantaneous speed of a vehicle, and lat and lon are a longitude and a latitude of the vehicle.

2) The system constructs the reported data as a vector $U_j=[u_{(j,1)}, u_{(j,2)}, \ldots, u_{(j,m)}]^T$ and a matrix $M=[U_1, U_2, \ldots, U_n]$:

$$M = \begin{bmatrix} u_{(1,1)} & u_{(2,1)} & \cdots & u_{(n,1)} \\ u_{(1,2)} & u_{(2,2)} & \cdots & u_{(n,2)} \\ \vdots & \vdots & \ddots & \vdots \\ u_{(1,m)} & u_{(2,m)} & \cdots & u_{(n,m)} \end{bmatrix}$$

Then, the matrix M is divided into M' and M":

$$M' = \begin{bmatrix} u'_{(1,1)} & u'_{(2,1)} & \cdots & u'_{(n,1)} \\ u'_{(1,2)} & u'_{(2,2)} & \cdots & u'_{(n,2)} \\ \vdots & \vdots & \ddots & \vdots \\ u'_{(1,m)} & u'_{(2,m)} & \cdots & u'_{(n,m)} \end{bmatrix}$$

$$M'' = \begin{bmatrix} u''_{(1,1)} & u''_{(2,1)} & \cdots & u''_{(n,1)} \\ u''_{(1,2)} & u''_{(2,2)} & \cdots & u''_{(n,2)} \\ \vdots & \vdots & \ddots & \vdots \\ u''_{(1,m)} & u''_{(2,m)} & \cdots & u''_{(n,m)} \end{bmatrix}$$

where $i_{(i,j)}$ represents the $i^{th}$ data set reported on the $j^{th}$ road section, and $u_{(i,j)}'$ and $u_{(i,j)}''$ represent two random components of $u_{(i,j)}$, namely, $u_{(i,j)}=u_{(i,j)}'=u_{(i,j)}''$: Then, the two parts are sent to the different RSUs.

3) When receiving data U, the RSU processes the data, constructs a vector $V=[v_1, v_2, v_3, \ldots v_m]$ based on an instantaneous speed in each piece of data, and computes an average speed on the road section according to the following formula:

$$v_\perp = \frac{\sum_{i=1}^{m} v_i}{m}$$

If it is set that a quantity of known road sections is w, the average speed is $V_\perp=[v_{(\perp,1)}, v_{(\perp,2)}, \ldots v_{(\perp,w)}]$. Then, the RSU divides the average speed into two vectors $V_\perp'=[v_{(\perp,1)}', v_{(\perp,2)}', \ldots v_{(\perp,w)}']$ and $V_\perp''=[v_{(\perp,1)}'', v_{(\perp,2)}'', \ldots v_{(\perp,w)}'']$. Likewise, the longitude and the latitude are processed.

The following describes a computation process performed by the RSU.

---

Protocol 1: The RSU performs interactive computation.

---

Input: task list $\Omega = [M', M'']$, where a row quantity and a column quantity in each of M' and M" are m and n respectively.
Output: intermediate results N' and N".
1 One RSU has a M', and the other RSU has a matrix M".
2 for $1 < j < n$
3 One RSU selects a vector $U_j' = M'(:, j)$, and the other selects a vector $U_j'' = M''(:, j)$.
4 for $1 < i < m$
5 Summate all elements in corresponding positions in $U_j'$ and $U_j''$, in other words,
   $u_\perp = [t_\perp, v_\perp, lat_\perp, lon_\perp]$.
6 end
7 end
8 One RSU obtains $N' = [u_{(\perp,1)}', u_{(\perp,2)}', \ldots, u_{(\perp,n)}']$.
9 The other RSU obtains $N'' = [u_{(\perp,1)}'', u_{(\perp,2)}'', \ldots, u_{(\perp,n)}'']$.
10 Return N' and N".

---

4) Finally, the system outsources, to the CPs, the vectors N' and N" obtained by dividing N, in other words, sends the vector N' to CPA and the vector N" to CPB.

Step S2: The two different RSUs outsource preprocessed vehicle data to the two CPs respectively. A data encryption execution protocol is designed based on a finally expected operation result and interactive operation between the two CPs, to encrypt the data.

Step S3: The NSP receives encrypted data from the CPs, decrypts the received encrypted data, and estimates an urban traffic status by using a compressive sensing technology.

In this embodiment, the data encryption execution protocol is a data encryption protocol based on secure two-party computation, and includes a basic secure computation protocol and a matrix secure computation protocol.

Preferably, the basic secure computation protocol includes a secure multiplicative protocol, a secure division protocol, a secure cosine protocol, a secure sine protocol, an extended secure cosine protocol, a reverse exponential protocol, an extended multiplicative protocol, and a secure arccosine protocol. Specifically:

(1) Secure multiplicative protocol (Mul): It is assumed that CPA has a random number $x \in \mathbb{Q}^+$ and CPB has a random number $Y \in \mathbb{Q}^+$. Mul is intended to obtain a value of $x \cdot y$ without leaking an intermediate result.

The protocol is executed according to the following four steps:

1) The TPS generates random numbers $r_a \in \mathbb{Q}^+$, $r_b \in \mathbb{Q}^+$, $k_a \in \mathbb{Q}^+$, and $k_b \in \mathbb{Q}^+$, where $k_a + k_b = r_a \cdot r_b$. Then, the TPS sends $(r_a, k_a)$ to CPA through a secure communication channel to CPA, and $(r_b, k_b)$ to CPB through a secure communication channel to CPB.

2) CPB performs computation according to $y' y + r_b$, and sends y' to CPA. Then, CPA performs computation according to $x'=x+r_a$, and sends a computation result to CPB.

3) CPB generates a random number $v_b$, performs computation according to $t=x' \cdot y + (k_b - v_b)$, and sends a computation result to CPA.

4) CPA performs computation according to $v_a = t + k_a - (r_a \cdot y')$.

After the Mul protocol is executed, CPA obtains $v_a$ and CPB obtains $v_b$ This process is represented as $(v_a : v_b) \leftarrow \text{Mul}(x:y)$ (2) Secure division protocol (Div): It is assumed that CPA has a random number $x \in \mathbb{Q}^+$ and CPB has a random number $y \in \mathbb{Q}^+$. Div is designed to obtain a value of $$v_a + v_b = \frac{x}{y}$$

without leaking an intermediate result. The protocol is executed according to the following four steps:

1) The TPS generates random numbers $r_a \in \mathbb{Q}^+$, $r_b \in \mathbb{Q}^+$, $k_a \in \mathbb{Q}^+$, and $k_b \in Q^+$, where $k_a + k_b = r_a \cdot r_b$. Then, the TPS sends $(r_a, k_a)$ to CPA through a secure communication channel to CPA, and $(r_b, k_b)$ to CPB through a secure communication channel to CPB.

2) CPA performs computation according to $x'=x+r_a$, and sends x' to CPB. Then, CPB performs computation according to $$y' = \frac{1}{y} + r_b,$$

and sends y' to CPA.

3) CPB generates a random number $v_b$, performs computation according to $$t = x' \cdot \frac{1}{y} + (k_b - v_b),$$

and sends a computation result to CPA.

4) CPA performs computation according to $v_a=t+k_a-(r_a \cdot y')$.

After the Div protocol is executed, CPA obtains $v_a$ and CPB obtains $v_b$. This process is represented as $(v_a:v_b) \leftarrow \text{Div}(x:y)$.

(3) Secure cosine protocol (Cos): It is assumed that CPA has a random number $x \in \mathbb{Q}^+$ and CPB has a random number $y \in \mathbb{Q}^+$. Cos is designed to obtain a value of $v_a+v_b=\cos(x+y)$ without leaking an intermediate result.

The protocol is executed according to the following three steps:

1) CPA performs computation according to $c_1=\cos(x)$ and $s_1=\sin(x)$. CPB performs computation according to $c_2=\cos(y)$ and $s_2=\sin(y)$.

2) Use the Mul protocol to compute $(v_a'+v_b') \leftarrow \text{Mul}(\cos(x):\cos(y))$ and $(v_a''+v_b'') \leftarrow \text{Mul}(\sin(x):\sin(y))$.

3) CPA performs computation according to $v_a=v_a'-v_a''$. CPB performs computation according to $v_b=v_b'-v_b''$.

After the Cos protocol is executed, CPA obtains $v_a$ and CPB obtains $v_b$. This process is represented as $(v_a:v_b) \leftarrow \text{Cos}(x:y)$.

(4) Secure sine protocol (Sin): It is assumed that CPA has a random number $x - \mathbb{Q}^+$ and CPB has a random number $y \in \mathbb{Q}^+$. Sin is designed to obtain a value of $v_a+v_b=\sin(x+y)$ without leaking an intermediate result.

The protocol is executed according to the following three steps:

1) CPA performs computation according to $x'=\sin(x)$ and $x''=\cos(x)$. CPB performs computation according to $y'=\sin(y)$ and $y''=\cos(y)$.

2) Use the Mul protocol to compute $(v_a':v_b') \leftarrow \text{Mul}(x':y')$ and $(v_a'':v_b'') \leftarrow \text{Mul}(x'':y'')$.

3) CPA performs computation according to $v_a=v_a'+v_a''$. CPB performs computation according to $v_b=v_b'+v_b''$.

After the sin protocol is executed, CPA obtains $v_a$ and CPB obtains $v_b$. This process is represented as $(v_a:v_b) \leftarrow \text{Sin}(x:y)$.

(5) Extended secure cosine protocol (Ecos): It is assumed that CPA has $(x_1, y_1)$ and CPB has $(x_2, y_2)$. Ecos is designed to obtain a value of $v_a+v_b=\cos(x_1+x_2)\cos(y_1+y_2)$ without leaking an intermediate result.

The protocol is executed according to the following two steps:

1) Execute $(v_a':v_b') \leftarrow \text{Cos}(x_1:x_2)$, $(v_a'', v_b'') \leftarrow \text{Cos}(y_1:y_2)$, $(v_{a_1}, v_{b_1}) \leftarrow \text{Cos}(v_a':v_b'')$, and $(v_{a_2}, v_{b_2}) \leftarrow \text{Cos}(v_b':v_a'')$.

2) CPA performs computation according to $v_a=v_a' \cdot v_a''+v_{a_1}+v_{a_2}$. CPB performs computation according to $v_b=v_b' \cdot v_b''+v_{b_1}+v_{b_2}$.

After the Ecos protocol is executed, CPA obtains $v_a$ and CPB obtains $v_b$. This process is represented as $(v_a:v_b) \leftarrow \text{Ecos}((x_1,y_1):(x_2,y_2))$.

(6) Reverse exponential protocol (Rexp): It is assumed that CPA has a random number $x \in \mathbb{Q}^+$ and CPB has a random number $y \in \mathbb{Q}^+$. Rexp is designed to obtain a value of $v_a+v_b=e^{-(x+y)}$ without leaking an intermediate result.

The protocol is executed according to the following four steps:

1) The TPS generates random numbers $r_a \in \mathbb{Q}^+$, $r_b \in \mathbb{Q}^+$, $k_a \in \mathbb{Q}^+$, and $k_b \in \mathbb{Q}^+$, where $k_a+k_b=r_a \cdot r_b$. Then, the TPS sends $(r_a, k_a)$ to CPA through a secure communication channel to CPA, and $(r_b, k_b)$ to CPB through a secure communication channel to CPB.

2) CPB performs computation according to $y'=e^{-y}+r_b$, and sends $y'$ to CPA. Then, CPA performs computation according to $x'=e^{-x}+r_a$, and sends $x'$ to CPB.

3) CPB generates a random number $v_b$, performs computation according to $t=x' \cdot e^{-y}+k_b-v_b$, and sends a computation result to CPA.

4) CPA performs computation according to $v_a=t+k_a-r_a \cdot y'$.

After the Rexp protocol is executed, CPA obtains $v_a$ and CPB obtains $v_b$. This process is represented as $(v_a:v_b) \leftarrow \text{Rexp}(x:y)$.

(7) Extended multiplicative protocol (Emul): It is assumed that CPA has random numbers $x_1 \in \mathbb{Q}^+$ and $y_1 \in \mathbb{Q}^+$, and CPB has random numbers $x_2 \in \mathbb{Q}^+$ and $y_2 \in \mathbb{Q}^+$. Emul is designed to obtain a value of $v_a+v_b=(x_1+x_2) \cdot (y_1+y_2)$ without leaking an intermediate result.

The protocol is executed according to the following two steps:

1) Execute $(v_a':v_b') \leftarrow \text{Mul})$ and $(v_a'':v_b'') \leftarrow \text{Mul}(y_1: x_2)$ and then send $(v_a', v_a'')$ to CPA and $(v_b', v_b'')$ to CPB.

2) CPA performs computation according to $v_a=x_1 \cdot y_1+v_a'+v_a''$. CPB performs computation according to $v_b=x_2 \cdot y_2+v_b' \pm v_b''$.

After the Emul protocol is executed, CPA obtains $v_a$ and CPB obtains $v_b$. This process is represented as $(v_a:v_b) \leftarrow \text{Emul}((x_1,y_1):(x_2,y_2))$.

(8) Secure arccosine protocol (Arccos): It is assumed that CPA has a random number $x \in \mathbb{Q}^+$ and CPB has a random number $y \in \mathbb{Q}^+$. Emul is designed to obtain a value of $v_a+v_b=\arccos(x+y)$ without leaking an intermediate result. Based on a series expansion, an arccosine value can be computed according to the following formula:

$$\arccos(x) = \frac{\pi}{2} - \sum_{n=0}^{\infty} \frac{(2n)!}{4^n (n!)^2 (2n+1)} x^{2n+1}$$

In fact, a McLaughlin expansion may be used, and an approximate arccosine value is selected, so that $$\arccos(x) \approx \frac{\pi}{2} - \chi,$$

where $\chi$ is a part of the McLaughlin series expansion, and is described as follows:

$$\chi \approx \frac{\pi}{2} - \left(x + \frac{1}{6}x^3 + \frac{3}{40}x^5 + \frac{5}{112}x^7 + \frac{35}{1152}x^9 + o(x^9)\right)$$

Therefore, x may be used to replace X+y to obtain the approximate arccosine value. Then, the Binomial Theorem is used to compute a value of $(x+Y)^n$.

$$(x+y)^n = C_n^0 x^n y^0 + C_n^1 x^{n-1} y^1 + \ldots + C_n^n x^0 y^n$$

Herein, the Mul protocol may be invoked to compute the arccosine value. Therefore, the Arccos protocol may be expressed as $(v_a:v_b) \leftarrow \text{Arccos}(x+y)$.

Preferably, in this embodiment, the matrix secure computation protocol specifically refers to extended secure computation protocols Mmul and Mdiv that are designed by means of hadamard product, where Mmul and Mdiv are respectively obtained by replacing random numbers in Mul and Div with matrices.

In this embodiment, after CPA and CPB respectively receive the vectors N' and N'', CPA and CPB further need to perform interactive computation to obtain a traffic congestion rate C and a spatio-temporal correlation matrix G.

A traffic congestion rate set C of a known road section is computed as follows:

First, when intermediate values in an interactive computation process performed by CPA and CPB are not leaked, a formula $$c = \frac{1}{v_\perp}$$

is used for computation. Next, CPA and CPB generate vectors $S'=[1/2, 1/2, \ldots, 1/2]_{1\times w}$ and $S''=[1/2, 1/2, \ldots, 1/2]_{1\times w}$, and use the vectors for subsequent computation, where w is a quantity of known road sections. Finally, CPA and CPB perform interactive computation and execute $(C', C'') \leftarrow Mdiv((V_\perp', S'):(V_\perp'', S''))$. CPA obtains a result C', and CPB obtains a result C''.

The following describes in detail how to compute the traffic congestion rates C' and C''.

---

Protocol 2: Cloud computing (cloud-process)

Input task list $\Omega = [N_o', N_o'']$, where a
quantity of elements in $N_o'$ or $N_o''$ is w.
Output: traffic congestion rates C' and C''.
1 CPA has the matrix $N_o'$, and generates a
  matrix S' and an empty matrix V'. CPB as the
  matrix $N_o''$, and generates a matrix S'' and an empty matix
  V''.
2 for 1 < i < w
3 CPA selects an element $v_{(\perp, i)}'$ from $N_i'$,
  and inserts the element into V', in other words,
  $V_\perp' = [v_{(\perp, 1)}', v_{(\perp, 2)}', \ldots, v_{(\perp, w)}']$.
4 CPB selects an element $v_{(\perp, i)}''$ from $N_i''$,
  and inserts the element into V'', in other words,
  $V_\perp'' = [v_{(\perp, 1)}'', v_{(\perp, 2)}'', \ldots, v_{(\perp, w)}'']$.
5 end
6 CPA and CPB interactively execute
  $(C', C'') \leftarrow Mdiv((V', S'):(V'', S''))$.
7 Return C' and C''.

---

Next, the spatio-temporal correlation matrix G is computed. First, a Euclidean distance between the CPs is computed. It is assumed that there are two GPS points $a=(lat_a, lon_a)$ and $b=(lat_b, lon_b)$. A Euclidean distance L may be computed according to the following formula:

$$L = R \cdot \arccos(L_1 + L_2)$$

In the foregoing formula, $L_1 \cos(lat_a) \cdot \cos(lat_b) \cdot \cos(lon_a - lon_b)$ and $L_2 = \sin(lat_a) \cdot \sin(lat_b)$. The two GPS points a and b each are divided into two parts. For example, a is divided into $a'=(lat_a', lon_a')$ and $a''=(lat_a'', lon_a'')$ and b is divided into $b'=(lat_b', lon_b')$ and $b''=(lat_b'', lon_b'')$. a' and b' exist at the same time, and a'' and b'' also exist at the same time. We design a secure distance computation protocol Dis for computing the Euclidean distance between a and b under privacy preserving, in other words, $(l_1:l_2) \leftarrow Dis(a:b)$. L is specifically computed according to the following steps:

1) Execute $(v_{a_1}:v_{b_1}) \leftarrow Sin(lat_a':lat_a'')$, $(v_{a_2}:v_{b_2}) \leftarrow Sin(lat_b': lat_b'')$, $(v_{a_3}:v_{b_3}) \leftarrow Ecos(a:b)$, $(v_{a_4}:v_{b_4}) \leftarrow Mul(v_{a_1}:v_{b_2})$, and $(v_{a_5}:v_{b_5}) \leftarrow Mul(v_{b_1}:v_{a_2})$.

2) CPA performs computation according to $v_{a_6} = v_{a_1} \cdot v_{a_2} + v_{a_3} + v_{a_4}$ and $x' = lon_a' - lon_b'$. CPB performs computation according to $v_{b_6} = v_{b_1} \cdot v_{b_2} + v_{b_3} + v_{b_4}$ and $y' = lon_a'' - lon_b''$.

3) Compute $(v_{a_7}:v_{b_7}) \leftarrow Cos(x':y')$ and $(v_{a_8}:v_{b_8}) \leftarrow Emul((v_{a_3}: v_{a_7}):(v_{b3}:v_{b_7}))$. Then, CPA performs computation according to $v_{a_9} = v_{a_6} + v_{a_8}$, and CPB performs computation according to $v_{b_9} = v_{b_6} + v_{b_8}$.

4) According to the protocol $(v_a:v_b) \leftarrow Arcos(v_{a_3}:v_{b3})$, CPA performs computation according to $l_1 = R \cdot v_a$, and CPB performs computation according to $l_2 = R \cdot v_b$, where R is the radius of Earth. According to the foregoing execution steps, the Euclidean distance L between the GPS points a and b can be obtained, namely, $L = i_1 + l_2$.

For an entire urban road network, the system selects, from N' and N'', elements reflecting spatial-temporal features, and constructs matrices $\hbar' = [[lat_{(\perp,1)}', lon_{(\perp,1)}'], \ldots, [lat_{(\perp,n)}', lon_{(\perp,n)}']]$ and $\hbar'' = [[lat_{(\perp,1)}'', lon_{(\perp,1)}''], \ldots, [lat_{(\perp,n)}'', lon_{(\perp,n)}'']]$ that include only GPS information. Then, the Mdis protocol is used to compute latitude and longitude distances between any two GPS points, in other words, a and b in Dis are replaced by $\hbar'$ and $\hbar''$ to obtain $(D':D'') \leftarrow Mdis(\hbar':\hbar'')$, where $D = D' + D''$. Assuming that there are n road sections in a city, dimensions of D are n×n.

The following describes in detail how to compute D.

---

Protocol 3: cloud computing (distance-D)

Input: task list $\Omega = [N', N'']$, where a
quantity of elements in N' or N'' is n.
Output: intermediate results D' and D''.
1 Select $\hbar' = [[lat_{(\perp,1)}', lon_{(\perp,1)}'], \ldots, [lat_{(\perp,n)}', lon_{(\perp,n)}']]$ and
  $\hbar'' = [[lat_{(\perp,1)}'', lon_{(\perp,1)}''], \ldots, [lat_{(\perp,n)}'', lon_{(\perp,n)}'']]$
  from N' and N'' respectively.
2 for 1 < i < n
3 for 1 < j < n
4 Execute for Dis protocol
  $(l':l'') \leftarrow Dis((\hbar'[i], \hbar''[i]):(\hbar'[j], \hbar''[j]))$.
5 end
6 end
7 Return $D' = [l_{(i,j)}']_{n\times n}$ and $D'' = [l_{(i,j)}'']_{n\times n}$.

---

Preferably, in this embodiment, traffic monitoring of a few road sections is implemented by using the compressive sensing technology. A Gaussian kernel function $$e^{\frac{d^2}{2\sigma^2}}$$

is introduced into our mechanism, where d is defined as a Euclidean distance between any two GPS points, and σ is a correlation coefficient used to determine impact between two GPS points. A value of σ may be obtained by training data based on the Bayesian framework. The Gaussian kernel function $$e^{\frac{d^2}{2\sigma^2}}$$

is used to generate a correlation matrix G, where G is in the following form:

$$G = \begin{bmatrix} e^{-\frac{d_{11}^2}{2\sigma^2}} & e^{-\frac{d_{12}^2}{2\sigma^2}} & \ldots & e^{-\frac{d_{1n}^2}{2\sigma^2}} \\ e^{-\frac{d_{21}^2}{2\sigma^2}} & e^{-\frac{d_{22}^2}{2\sigma^2}} & \ldots & e^{-\frac{d_{2n}^2}{2\sigma^2}} \\ \vdots & \vdots & \ddots & \vdots \\ e^{-\frac{d_{n1}^2}{2\sigma^2}} & e^{-\frac{d_{n2}^2}{2\sigma^2}} & \ldots & e^{-\frac{d_{nn}^2}{2\sigma^2}} \end{bmatrix}$$

CPA has the matrix D', and CPB has the matrix D'', where $D = D' + D''$. D is computed according to the following steps:

1) Execute $(L_a':L_b') \leftarrow \text{Mmul}(D':D'')$.
2) CPA performs computation according to $$W_1 = \frac{1}{2\sigma^2} \cdot (D'^2 + 2 \cdot L_a').$$

3) CPB performs computation according to $$W_2 = \frac{1}{2\sigma^2} \cdot (D''^2 + 2 \cdot L_b').$$

4) Execute $(L_a:L_b) \leftarrow \text{Rexp}(W_1:W_2)$.

Figure 5:
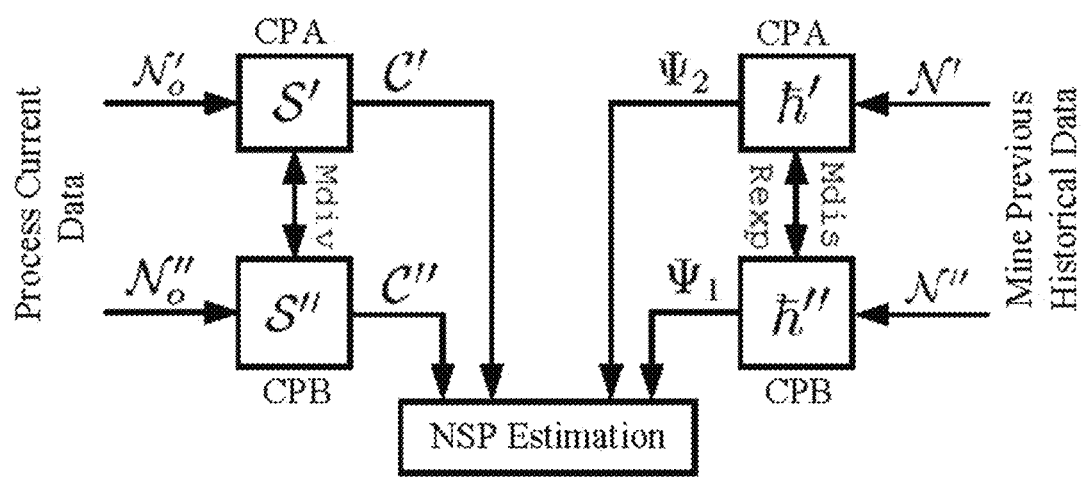
FIG. 5 shows a processing procedure of a congestion rate and a sparse representation matrix.

After the foregoing protocol is executed, an orthogonal feature vector basis can be generated by G that is generated by using the Gaussian kernel function. According to a formula $G = \Psi \Lambda \Psi^{-1}$, G is diagonalized into three parts: $\Psi$, $\Lambda$, and $\Psi^{-1}$. Herein, $\Psi$ indicates a compressive sensing spare representation matrix, and is randomly divided into $\Psi_1$ and $\Psi_2$. Then, $\Psi_1$ and $\Psi_2$ are sent to CPA and CPB respectively. Then, $\Psi_1$ and $\Psi_2$ may be used by the NSP to estimate a traffic congestion rate of an unknown road section. A complicated cloud computing process is shown in FIG. 5.

In this embodiment, the step S3 specifically includes the following substeps:

Step S31: Complete a setting that there are n road sections in a city, and compute traffic congestion rates of w road sections within a time interval T' (w<<n), where CPA has a vector $C' = [c_1', c_2', \ldots, c_w']$ and CPB has a vector $C'' = [c_1'', c_2'', \ldots, c_w'']$.

Step S32: The TPS generates a random measurement matrix $\Phi \in \mathbb{R}^{r \times n}$, and the NSP receives component vectors C', C'', $\Phi$, $\Psi_1$, and $\Psi_2$, to obtain a formula $C' + C'' = \Phi \times (\Psi_1 + \Psi_2) \times C$, where C includes the traffic congestion rates of all the road sections.

Step S33: The NSP obtains C based on an optimization algorithm, and sends a road traffic status to a vehicle by using a navigation application.

The afore-mentioned are only preferred embodiments of the present disclosure, and all equivalent changes and modifications made in accordance with the claims of the present disclosure shall fall within the scope of the present disclosure.

What is claimed is:

1. A realtime urban traffic status monitoring method based on privacy-preserving compressive sensing, comprising the following steps:

step S1: dividing vehicle data under privacy preserving into two parts, and sending the two parts to two different road side units (RSU) for preprocessing;

step S2: outsourcing, by the two different RSUs, preprocessed vehicle data to two cloud platforms (CP) respectively, and
designing a data encryption execution protocol based on a finally expected operation result and interactive operation between the two CPs, to encrypt the data; and step S3: receiving, by a navigation service provider (NSP), encrypted data from the CPs, decrypting the received encrypted data, and estimating an urban traffic status by using a compressive sensing technology.

2. The realtime urban traffic status monitoring method based on privacy-preserving compressive sensing according to claim 1, wherein the step S1 specifically comprises the following substeps:

step S11: completing a setting that there are n roads in a city, a total of m pieces of data are uploaded by all vehicles on a road section j within a time period T, and each piece of data is in a format of u=[t,v,lat,lon] wherein t is uploading time, v is an instantaneous speed of a vehicle, and lat and lon are a longitude and a latitude of the vehicle;

step S12: constructing, by a system, the reported data as a vector $U_j = [u_{(j,1)}, u_{(j,2)}, \ldots, u_{(j,m)}]^T$ and a matrix $M = [U_1, U_2, \ldots, U_n]$:

$$M = \begin{bmatrix} u_{(1,1)} & u_{(2,1)} & \cdots & u_{(n,1)} \\ u_{(1,2)} & u_{(2,2)} & \cdots & u_{(n,2)} \\ \vdots & \vdots & \ddots & \vdots \\ u_{(1,m)} & u_{(2,m)} & \cdots & u_{(n,m)} \end{bmatrix}$$

randomly dividing the matrix M into M and M $$M' = \begin{bmatrix} u'_{(1,1)} & u'_{(2,1)} & \cdots & u'_{(n,1)} \\ u'_{(1,2)} & u'_{(2,2)} & \cdots & u'_{(n,2)} \\ \vdots & \vdots & \ddots & \vdots \\ u'_{(1,m)} & u'_{(2,m)} & \cdots & u'_{(n,m)} \end{bmatrix} M'' = \begin{bmatrix} u''_{(1,1)} & u''_{(2,1)} & \cdots & u''_{(n,1)} \\ u''_{(1,2)} & u''_{(2,2)} & \cdots & u''_{(n,2)} \\ \vdots & \vdots & \ddots & \vdots \\ u''_{(1,m)} & u''_{(2,m)} & \cdots & u''_{(n,m)} \end{bmatrix}$$

wherein $u_{(i,j)}$ represents the $i^{th}$ data set reported on the $j^{th}$ road section, and $u_{(i,j)}'$ and $u_{(i,j)}''$ represent two random components of $u_{(i,j)}$, namely, $u_{(i,j)} = u_{(i,j)}' + u_{(i,j)}''$:

step S13: sending the two random components to the different RSUs respectively;

step S14: processing, by the RSU when receiving data U, the data, constructing a vector $V = [v_1, v_2, v_3, \ldots, v_m]$ based on an instantaneous speed in each piece of data, and computing an average speed on the road section according to the following formula:

$$v_\perp = \frac{\sum_{i=1}^{m} v_i}{m}$$

step S15: completing a setting that a quantity of known road sections is w, and obtaining the average speed $V_\perp = [v_{(\perp,1)}, v_{(\perp,2)}, \ldots, v_{(\perp,w)}]$; and then dividing, by the RSU, the average speed into two vectors $V_\perp' = [v_{(\perp,1)}', v_{(\perp,2)}', \ldots, v_{(\perp,w)}']$; and $V_\perp'' = [v_{(\perp,1)}'', v_{(\perp,2)}'', \ldots, v_{(\perp,w)}'']$, wherein same processing is performed on the longitude and the latitude; and step S16: outsourcing, to the CPs, vectors N' and N'' obtained by dividing N, in other words, sending the vector N' to CPA and the vector N'' to CPB.

3. The realtime urban traffic status monitoring method based on privacy-preserving compressive sensing according to claim 1, wherein the data encryption execution protocol is a data encryption protocol based on secure two-party computation, and comprises a basic secure computation protocol and a matrix secure computation protocol.

4. The realtime urban traffic status monitoring method based on privacy-preserving compressive sensing according to claim 3, wherein the basic secure computation protocol comprises a secure multiplicative protocol, a secure division protocol, a secure cosine protocol, a secure sine protocol, an extended secure cosine protocol, a reverse exponential protocol, an extended multiplicative protocol, and a secure arccosine protocol.

5. The realtime urban traffic status monitoring method based on privacy-preserving compressive sensing according to claim 3, wherein the matrix secure computation protocol specifically refers to extended secure computation protocols Mmul and Mdiv that are designed by means of hadamard product, wherein Mmul and Mdiv are respectively obtained by replacing random numbers in Mul and Div with matrices.

6. The realtime urban traffic status monitoring method based on privacy-preserving compressive sensing according to claim 3, wherein the data encryption protocol based on secure two-party computation further integrates the compressive sensing theory, and specifically, a measurement matrix and a sparse representation matrix that are required for compressive sensing are also used as keys for vehicle data encryption, and then are integrated into the data encryption protocol based on secure two-party computation.

7. The realtime urban traffic status monitoring method based on privacy-preserving compressive sensing according to claim 1, wherein the step S3 specifically comprises the following substeps:

step S31: completing a setting that there are n road sections in a city, and computing traffic congestion rates of W road sections within a time interval T' (w<<n), wherein CPA has a vector $C'=[c_1', c_2', \ldots c_w']$ and CPB has a vector $C''=[c_1'', c_2'', \ldots c_w'']$;

step S32: generating, by a third-party service provider (TPS), a random measurement matrix $\Phi \in \mathbb{R}^{r \times n}$ and receiving, by the NSP, component vectors C', C'', $\Phi$, $\Psi_1$, and $\Psi_2$, to obtain a formula $C'+C''=\Phi \times (\Psi_1+\Psi_2) \times C$, wherein C comprises the traffic congestion rates of all the road sections; and step S33: obtaining, by the NSP, C based on an optimization algorithm, and sending a road traffic status to a vehicle by using a navigation application.

8. A realtime urban traffic status monitoring system based on privacy-preserving compressive sensing, comprising data vehicles (DVs), two RSUs, two CPs, a TPS, and an NSP, wherein the DVs are configured to obtain vehicle traveling data;

the RSU is configured to preprocess the vehicle traveling data, and outsource preprocessed vehicle data to the two CPs respectively;

the CP is configured to store and further process the data;

the TPS is trusted by all parties and responsible for generating a required random number; and the NSP is configured to receive ciphertext from the CP, estimate a traffic status of a road section, and transmit an estimated traffic congestion rate to a vehicle.

* * * * *